Patented May 16, 1933

1,909,436

UNITED STATES PATENT OFFICE

OLIVER M. URBAIN, OF COLUMBUS, OHIO, ASSIGNOR TO CHARLES H. LEWIS, OF HARPSTER, OHIO

PROCESS FOR THE REMOVAL OF COLLOIDS FROM LIQUIDS

No Drawing.   Application filed May 12, 1932.   Serial No. 610,974.

This invention relates to a process for flocculating colloids present in liquids.

It has heretofore been proposed to flocculate colloids in liquids by first imparting to the colloids a complete negative charge and then incorporating in the liquid an electrolyte, for example, an inorganic ionizable salt having a cation of high valence and an anion of low valence. The divalent Ca ions and the trivalent Fe ions are largely used for this purpose.

The present invention relates to an improvement in the prior processes for flocculating colloids and contemplates the employment in such processes of a novel electrolyte.

More specifically, it is the purpose of the present invention to provide for the flocculation of colloids by the employment of small quantities of organic polycyclic cations. In the use of inorganic electrolytes for flocculating negatively charged colloids it is known however, the valence of the organic polycyclic cation is unimportant, constitution being the cation of the electrolyte employed.

In accordance with the present invention, however, the valence of the organic polycyclic cation is unimportant, constitution being the all-important factor.

In its specific aspect the invention, therefore, embraces the use for flocculating negatively charged colloids of electrolyte containing organic polycyclic cations or cations made up in part of polycyclic radicals or substituted radicals.

There are certain requirements which the electrolytes containing the organic polycyclic cations must meet in order to function properly in the process. They must of necessity be soluble at least to the extent required for flocculation. Their cations must not be subject to bacterial decomposition which would give the liquid, if any excess of the cations remained therein, a subsequent demand for oxygen. To meet the latter requirement the organic polycyclic compounds must be limited to saturated compounds, that is, saturated to oxygen biologically.

As stated, in accordance with the present invention the cation of the electrolyte must have a polycyclic residue incorporated therein. To incorporate a polycyclic residue within the cation of the electrolyte, it is necessary to start out with a compound within which it is first possible to introduce a polycyclic radical or radicals or polycyclic residues. The onium compounds are such compounds and the only compounds which can be used as a starting point. An onium compound is defined as one of a class or group of organic compounds of the type $RXH_y$ which are isologs of ammonium and contain the element X in its highest positive valency. R is equal to one or more hydrocarbon radicals or substituted hydrocarbon radicals and $y$ is numerically equal to the difference in valence between X and R.

The principal classes of onium compounds are ammonium, sulfonium, selenonium, oxionium, tellurionium, iodonium, stibonium, arsonium, phosphonium, stannonium, hydrazonium, diazonium and germanonium. The onium compounds ionize strongly. As an example of the group the structure of stibonium is as follows:—

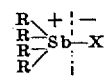

R may be equal to H (hydrogen), or any hydrocarbon radical or substituted hydrocarbon radical, the total valencies being equal to the difference in valence between the highest positive valence of Sb (antimony) and that of X, and there being at least one hydrocarbon radical or substituted hydrocarbon radical attached to the Sb. X equals any negative univalent acidic element, group or radical such as Cl, $NO_3$ or Br. The compound dissociates at the dotted line, the positive cation being on the left and the negative ion ($x$) being on the right.

It is seen that with stibonium it is possible to introduce into the structure four univalent polycyclic radicals or substituted polycyclic radicals, or their equivalent in divalent radicals or substituted radicals, or two univalent polycyclic radicals or substituted polycyclic radicals and one divalent polycyclic radical or substituted polycyclic radical. It is also seen that after the introduction of such polycyclic radicals or substituted radicals they appear within the cation structure. It is according to this procedure that the novel electrolyte is evolved.

The method of preparation of the electrolyte is the same regardless of the choice of onium compound as the starting point. As an example of the procedure let us start with substituted stibine.

Stibine is $SbH_3$. The structural formula is written:—

The formula for a substituted stibine is written:—

in which R is a polycyclic radical or substituted polycyclic radical. We then react this compound with an halogen acid, HX:—

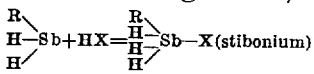

If a greater number of polycyclic radicals are wanted in the cation, it is necessary to start out with a disubstituted stibine or react with an alkyl halide RX, in which R is an alkyl radical. If we start out with a disubstituted stibine we have:—

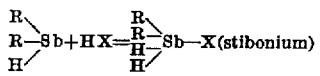

If we start out with a substituted stibine and react with an alkyl halide we have:—

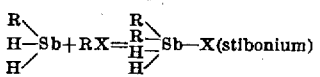

The following electrolytes have been prepared for use in the flocculation of colloids as indicated.

1. Hydrochloric acid gas was passed into dimethyl-α-naphthylamine, the reaction being as follows:—

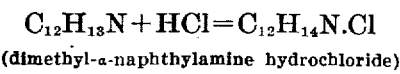

(dimethyl-α-naphthylamine hydrochloride)

2. Hydrochloric acid gas was passed into 2.4 dimethylquinoline, the reaction being:—

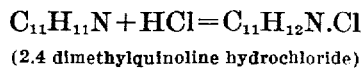

(2.4 dimethylquinoline hydrochloride)

3. Hydrochloric acid gas was passed into α-naphthylamine,—

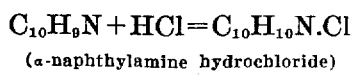

(α-naphthylamine hydrochloride)

4. Quinoline was reached with ethyl iodide, the reaction being:—

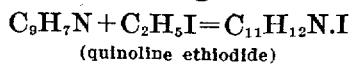

(quinoline ethiodide)

The first three reactions are examples of the preparation of the novel electrolyte using a substituted onium compound and an halogen acid. The last reaction is an example using a substituted onium compound and an alkyl halide. In each case the reagents are employed in gram molecular equivalents, mol for mol. Care should be exercised with such reactions as they proceed with great violence. It is best that the reactant, the halogen acid or the alkyl halide, be added to the substituted onium compound slowly and with constant agitation and maintain the mixture in an ice bath until the reactions are completed.

In carrying out the process of the present invention, the emulsoid colloids are desolvated by the addition of a desolvating agent to displace the water film adsorbed by the colloids, which may be an hydrous oxide or a phenolic ester. The amount will vary depending on the concentration of the colloidal matter in the liquid. Ordinarily .20 grams of a phenolic ester such as pentadigalloyl glucose per liter of liquid treated will be adequate.

Next the colloids are given a maximum charge or maximum cataphoretic velocity. This can be accomplished by increasing the hydroxyl ion concentration of the liquid containing the colloids to pH 9.5 by incorporating calcium hydroxide in the liquid.

The flocculated matter can be advantageously coagulated by such coagulants as aluminum sulphate or ferrous sulphate.

As illustrative of one application of the process in the removal of the colloidal fraction of domestic sewage, the sewage is treated with a desolvating agent and also with calcium hydroxide to give the requisite pH and has incorporated therein the novel electrolyte in a quantity depending on the concentration of the colloidal matter in the sewage. For example, in treating a liquid in which the colloidal matter present therein has a ten day biochemical oxygen demand of from 150 to 170, the organic polycyclic cation electrolyte should be incorporated in the liquid in quantities varying from 45 to 55 pounds per million gallons to effect complete flocculation, while sufficient coagulant will be added to coagulate the flocculated matter.

From the foregoing it will be apparent that the present invention enables one to effect complete flocculation of the colloidal matter in a liquid by the use of a very small quantity of the electrolyte. To effect comparable flocculation by the use of inorganic ionizable salts at least double the amount by weight of the electrolyte is necessary.

In carrying out the complete process the liquid containing the colloids to be flocculated may be first treated with the desolvating agent and then raised to a pH of 9.5 by the addition of calcium hydroxide following which the novel electrolyte is added and finally the coagulant incorporated to coagulate the flocculated matter.

Having thus described my invention, what I claim is:—

1. A process for flocculating colloids in liquids comprising the step of incorporating in the liquid saturated organic polycyclic cations or cations made up in part of polycyclic radicals or substituted radicals.

2. A process for flocculating colloids in liquids comprising the step of incorporating in the liquid an onium compound having incorporated in the cation thereof a polycyclic radical, or substituted polycyclic radical.

3. A process for flocculating colloids in liquids comprising desolvating first the colloids, then imparting a maximum negative charge thereto, and thereafter incorporating in the liquid an electrolyte, the cation of which contains saturated organic polycyclic radicals or substituted radicals, to flocculate the colloids.

4. In processes for flocculating colloids in liquids of the character in which a maximum negative charge is first imparted to the colloid and an electrolyte then employed to neutralize the charge and convert the colloids into suspensoids, the improvement which comprises using as an electrolyte a sufficiently soluble onium compound containing a polycyclic radical or substituted radical incorporated in the cation thereof and which has no latent biochemical oxygen demand.

OLIVER M. URBAIN.

CERTIFICATE OF CORRECTION.

Patent No. 1,909,436.        May 16, 1933.

OLIVER M. URBAIN.

It is hereby certified that error appears in the printed specification of the above numbered patent requiring correction as follows: Page 1, lines 22 and 23, strike out the words "however, the valence of the organic polycyclic cation is unimportant, constitution being" and insert instead "that the flocculating value of the electrolyte increases with an increase in the valence of"; and that the said Letters Patent should be read with this correction therein that the same may conform to the record of the case in the Patent Office.

Signed and sealed this 20th day of June, A. D. 1933.

M. J. Moore.

(Seal)        Acting Commissioner of Patents.

Having thus described my invention, what I claim is:—

1. A process for flocculating colloids in liquids comprising the step of incorporating in the liquid saturated organic polycyclic cations or cations made up in part of polycyclic radicals or substituted radicals.

2. A process for flocculating colloids in liquids comprising the step of incorporating in the liquid an onium compound having incorporated in the cation thereof a polycyclic radical, or substituted polycyclic radical.

3. A process for flocculating colloids in liquids comprising desolvating first the colloids, then imparting a maximum negative charge thereto, and thereafter incorporating in the liquid an electrolyte, the cation of which contains saturated organic polycyclic radicals or substituted radicals, to flocculate the colloids.

4. In processes for flocculating colloids in liquids of the character in which a maximum negative charge is first imparted to the colloid and an electrolyte then employed to neutralize the charge and convert the colloids into suspensoids, the improvement which comprises using as an electrolyte a sufficiently soluble onium compound containing a polycyclic radical or substituted radical incorporated in the cation thereof and which has no latent biochemical oxygen demand.

OLIVER M. URBAIN.

CERTIFICATE OF CORRECTION.

Patent No. 1,909,436.  May 16, 1933.

OLIVER M. URBAIN.

It is hereby certified that error appears in the printed specification of the above numbered patent requiring correction as follows: Page 1, lines 22 and 23, strike out the words "however, the valence of the organic polycyclic cation is unimportant, constitution being" and insert instead "that the flocculating value of the electrolyte increases with an increase in the valence of"; and that the said Letters Patent should be read with this correction therein that the same may conform to the record of the case in the Patent Office.

Signed and sealed this 20th day of June, A. D. 1933.

M. J. Moore.

(Seal)  Acting Commissioner of Patents.

CERTIFICATE OF CORRECTION.

Patent No. 1,909,436.  May 16, 1933.

OLIVER M. URBAIN.

It is hereby certified that error appears in the printed specification of the above numbered patent requiring correction as follows: Page 1, lines 22 and 23, strike out the words "however, the valence of the organic polycyclic cation is unimportant, constitution being" and insert instead "that the flocculating value of the electrolyte increases with an increase in the valence of"; and that the said Letters Patent should be read with this correction therein that the same may conform to the record of the case in the Patent Office.

Signed and sealed this 20th day of June, A. D. 1933.

M. J. Moore.

(Seal) Acting Commissioner of Patents.